(12) United States Patent
Iketani

(10) Patent No.: US 8,712,175 B2
(45) Date of Patent: Apr. 29, 2014

(54) IMAGE PROCESSING SYSTEM, IMAGE PROCESSING METHOD AND PROGRAM FOR IMAGE PROCESSING

(75) Inventor: Akihiko Iketani, Minato-ku (JP)

(73) Assignee: NEC Corporation, Tokyo (JP)

( * ) Notice: Subject to any disclaimer, the term of this patent is extended or adjusted under 35 U.S.C. 154(b) by 126 days.

(21) Appl. No.: 13/390,012

(22) PCT Filed: Jul. 22, 2010

(86) PCT No.: PCT/JP2010/004686
§ 371 (c)(1),
(2), (4) Date: Feb. 10, 2012

(87) PCT Pub. No.: WO2011/018878
PCT Pub. Date: Feb. 17, 2011

(65) Prior Publication Data
US 2012/0141042 A1 Jun. 7, 2012

(30) Foreign Application Priority Data
Aug. 13, 2009 (JP) ................................ 2009-187768

(51) Int. Cl.
*G06K 9/36* (2006.01)

(52) U.S. Cl.
USPC ........... 382/238; 382/232; 382/233; 382/240; 382/250; 382/251

(58) Field of Classification Search
USPC ................. 382/232, 233, 238, 240, 250, 251; 358/426.02, 426.06, 426.11; 348/394.1, 409.1, 410.1, 415.1, 416.1; 375/240.1, 240.24; 345/629, 634
See application file for complete search history.

(56) References Cited

U.S. PATENT DOCUMENTS 7,555,143 B2 * 6/2009 Flath et al. .................... 382/109
2005/0104902 A1 * 5/2005 Zhang et al. .................. 345/629

(Continued)

FOREIGN PATENT DOCUMENTS

| JP | 2004-272751 A | 9/2004 |
| JP | 2007-052672 A | 3/2007 |

(Continued)

OTHER PUBLICATIONS

Bryce B. Ready et al., "A Kalman-Filter Based Method for Creation of Super-Resolved Mosaicks", IEEE International Conference on Robotics and Automation, May 2006, pp. 3417-3422.

(Continued)

*Primary Examiner* — Ali Bayat
(74) *Attorney, Agent, or Firm* — Sughrue Mion, PLLC

(57) ABSTRACT

A geometric transformation parameter computing unit computes a geometric transformation parameter which represents the geometric transformation of an image from the previous frame to the current frame, and calculates the level of reliability in that geometric transformation parameter. A super-resolution image prediction unit generates a prediction of a super-resolution image in the current frame by transforming a super-resolution image in the previous frame on the basis of the geometric transformation parameter. A super-resolution image generation unit calculates a low-resolution image in the current frame from the prediction result of the super-resolution image in the current frame by a simulation, calculates a difference between a low-resolution image, which is an input image for the current frame, and the simulation result, and calculates a weighted mean between a result of upsampling the difference and the prediction result of the super-resolution image in the current frame. Herein, the weighted mean is calculated on the basis of the level of reliability in the geometric transformation parameter.

16 Claims, 13 Drawing Sheets

(56) References Cited

U.S. PATENT DOCUMENTS

| | | | |
|---|---|---|---|
| 2006/0247070 A1* | 11/2006 | Funk et al. | 473/222 |
| 2007/0008499 A1 | 1/2007 | Iketani et al. | |
| 2007/0041664 A1 | 2/2007 | Yamada | |
| 2007/0047838 A1* | 3/2007 | Milanfar et al. | 382/289 |
| 2008/0175519 A1 | 7/2008 | Nagumo | |
| 2008/0309778 A1* | 12/2008 | Tabatabai et al. | 348/222.1 |
| 2009/0169133 A1 | 7/2009 | Iketani et al. | |

FOREIGN PATENT DOCUMENTS

| | | |
|---|---|---|
| JP | 2008-109375 A | 5/2008 |
| JP | 2008-140012 A | 6/2008 |
| JP | 2010-134582 A | 6/2010 |
| WO | WO 2005/024723 A1 | 3/2005 |
| WO | WO 2007/122911 A1 | 11/2007 |

OTHER PUBLICATIONS

Greg Welch et al., "An Introduction to the Kalman Filter", UNC-Chapel Hill, TR 95-041, Jul. 24, 2006, pp. 1-16.

Sina Farsiu et al., "Video-to-Video Dynamic Super-Resolution for Grayscale and Color Sequences", EURASIP Journal on Applied Signal Processing, 2006, pp. 1-15, vol. 2006. No. 61859.

* cited by examiner

FIG. 2

| $a_{11}$ | $a_{12}$ | $a_{13}$ | $a_{14}$ | $a_{15}$ |
|---|---|---|---|---|
| $a_{21}$ | $a_{22}$ | $a_{23}$ | $a_{24}$ | $a_{25}$ |
| $a_{31}$ | $a_{32}$ | $a_{33}$ | $a_{34}$ | $a_{35}$ |
| $a_{41}$ | $a_{42}$ | $a_{43}$ | $a_{44}$ | $a_{45}$ |
| $a_{51}$ | $a_{52}$ | $a_{53}$ | $a_{54}$ | $a_{55}$ |

FIG. 4

$$B = \begin{pmatrix} 1/9 & 1/9 & 1/9 & 0 & 0 & 1/9 & 1/9 & 1/9 & 0 & 0 & 1/9 & 1/9 & 1/9 & 0 & 0 & \cdots & 0 & 0 & 0 & 0 & 0 & 0 & 0 & 0 & 0 & 0 & 0 \\ 0 & 1/9 & 1/9 & 1/9 & 0 & 0 & 1/9 & 1/9 & 1/9 & 0 & 0 & 1/9 & 1/9 & 1/9 & 0 & \cdots & 0 & 0 & 0 & 0 & 0 & 0 & 0 & 0 & 0 & 0 & 0 \end{pmatrix}$$

FIG. 5

| $a_{11}$ | $a_{13}$ | $a_{15}$ |
|---|---|---|
| $a_{31}$ | $a_{33}$ | $a_{35}$ |
| $a_{51}$ | $a_{53}$ | $a_{55}$ |

IMAGE PROCESSING SYSTEM, IMAGE PROCESSING METHOD AND PROGRAM FOR IMAGE PROCESSING

CROSS REFERENCE TO RELATED APPLICATIONS

This application is a National Stage of International Application No. PCT/JP2010/004686 filed on Jul. 22, 2010, which claims priority from Japanese Patent Application No. 2009-187768, filed on Aug. 13, 2009, the contents of all of which are incorporated herein by reference in their entirety.

TECHNICAL FIELD

The present invention relates to an image processing system, an image processing method, and a program for image processing, and particularly to an image processing system, an image processing method, and a program for image processing capable of improving the image quality of a dynamic image.

BACKGROUND ART

There have been suggested various techniques for generating a high-resolution image having a higher resolution from a plurality of low-resolution images obtained by taking pictures of the same subject (for example, see Patent Literature (PTL) 1). This high-resolution image is referred to as a super-resolution image.

In recent years, there has been increased a need for a video super-resolution technique for generating a dynamic image having a higher resolution from a low-resolution dynamic image by applying the technique not only to static images, but also to a dynamic image. The video super-resolution technique is used for upconversion, for example, for use in displaying a video picture, which has been taken at standard-definition (SD) resolution, on a high-definition (HD) television receiver.

PTL 1 describes a high-resolution image generation method for generating a high-resolution image from a plurality of low-resolution images with position deviation. In the method described in PTL 1, each pixel of the plurality of low-resolution images is associated with a certain position in a high-resolution image space. More specifically, after registration, the plurality of low-resolution images are assumed to be pixels sampled in an unequally spaced manner within the high-resolution space. In the method described in PTL 1, the locations of the pixels sampled in the unequally spaced manner (referred to as observed pixel locations) are approximated to the pixel locations of the high-resolution image. In this instance, the observed pixel locations, which are approximated to the high-resolution pixel locations, may be a plurality of pixel locations or no pixel locations in some cases. In the method described in PTL 1, one image is generated by calculating a mean value of a plurality of observed pixels approximated to the respective high-resolution pixel locations. In the method described in PTL 1, this image is referred to as "mean image." Similarly, the observed pixels approximated to the respective high-resolution pixel locations also constitute one image. In PTL 1, this image is referred to as "weighted image." In the method described in PTL 1, the mean image and the weighted image are generated from the plurality of low-resolution images and the position deviation information of the low-resolution images obtained by registration. Thereafter, a high-resolution image is generated by estimating the pixel value of an undefined pixel included in the generated mean image. Moreover, in the method described in PTL 1, every time a low-resolution image is obtained, the mean image and the weighted image are updated to generate a high-resolution image sequentially.

Furthermore, as a technique for estimating the states of various systems or the like, a Kalman filter is known. The Kalman filter is described in, for example, Non Patent Literature (NPL) 1. In the Kalman filter described in NPL 1, a least squares solution is calculated by sequentially repeating the prediction and update of the states in the case where noises $w_t$ and $v_t$ conform to the normal distribution given by expression (1) and expression (2) described below.

$$w_t \text{ to } N(0,Q) \qquad \text{Expression (1)}$$

$$v_t \text{ to } N(0,R) \qquad \text{Expression (2)}$$

CITATION LIST

Patent Literature

PTL 1: Japanese Patent Application Laid-Open No. 2008-109375 (paragraphs 0022 to 0034)

Non Patent Literature

NPL 1: Greg Welch, Gray Bishop, "An Introduction to the Kalman Filter," Technical Report TR 95-041, University of North Carolina, Department of Computer Science, 1995.

SUMMARY OF INVENTION

Technical Problem

The method described in PTL 1 has a problem of a decrease in the image quality of super-resolution images in the case of a failure in registration of low-resolution images.

Therefore, it is an object of the present invention to provide an image processing system, an image processing method, and a program for image processing capable of solving the problem of a decrease in the image quality of high-resolution images caused by a failure in registration of images in the case of increasing the resolution of a video.

Solution to Problem

According to an aspect of the present invention, there is provided an image processing system including: a geometric transformation parameter computing means for computing a geometric transformation parameter which represents a geometric transformation of an image from the previous frame to the current frame and calculating the level of reliability in the geometric transformation parameter; a super-resolution image prediction means for generating a prediction of a super-resolution image in the current frame by transforming a super-resolution image generated in the previous frame on the basis of the geometric transformation parameter; and a super-resolution image generation means for generating the super-resolution image in the current frame by calculating a low-resolution image in the current frame from the prediction result of the super-resolution image in the current frame by a simulation, calculating a difference between a low-resolution image, which is an input image for the current frame, and the low-resolution image calculated by the simulation, and calculating a weighted mean between a result of upsampling the difference to the same number of pixels as that of the super-resolution image and the prediction result of the super-resolution image in the current frame, wherein the super-resolution image generation means calculates the weighted mean on the basis of the level of reliability in the geometric transformation parameter.

Further, according to another aspect of the present invention, there is provided an image processing method which includes: computing a geometric transformation parameter which represents a geometric transformation of an image from the previous frame to the current frame and calculating the level of reliability in the geometric transformation parameter; generating a prediction of a super-resolution image in the current frame by transforming a super-resolution image generated in the previous frame on the basis of the geometric transformation parameter; generating the super-resolution image in the current frame by calculating a low-resolution image in the current frame from the prediction result of the super-resolution image in the current frame by a simulation, calculating a difference between a low-resolution image, which is an input image for the current frame, and the low-resolution image calculated by the simulation, and calculating a weighted mean between a result of upsampling the difference to the same number of pixels as that of the super-resolution image and the prediction result of the super-resolution image in the current frame; and calculating the weighted mean on the basis of the level of reliability in the geometric transformation parameter in calculating the weighted mean.

Further, according to still another aspect of the present invention, there is provided a program for image processing for causing a computer to perform: a geometric transformation parameter computing process for computing a geometric transformation parameter which represents a geometric transformation of an image from the previous frame to the current frame and calculating the level of reliability in the geometric transformation parameter; a super-resolution image prediction process for generating a prediction of a super-resolution image in the current frame by transforming a super-resolution image generated in the previous frame on the basis of the geometric transformation parameter; and a super-resolution image generation process for generating the super-resolution image in the current frame by calculating a low-resolution image in the current frame from the prediction result of the super-resolution image in the current frame by a simulation, calculating a difference between a low-resolution image, which is an input image for the current frame, and the low-resolution image calculated by the simulation, and calculating a weighted mean between a result of upsampling the difference to the same number of pixels as that of the super-resolution image and the prediction result of the super-resolution image in the current frame, wherein, in the super-resolution image generation process, the program causes the computer to calculate the weighted mean on the basis of the level of reliability in the geometric transformation parameter.

Advantageous Effects of Invention

The present invention is able to solve the problem of a decrease in the image quality of high-resolution images caused by a failure in registration of images in the case of increasing the resolution of a video.

BRIEF DESCRIPTION OF DRAWINGS

FIG. 2 is an explanatory diagram illustrating an example of an image to be gradated.

FIG. 4 is an explanatory diagram illustrating an example of a matrix B representing a gradation.

FIG. 5 is an explanatory diagram illustrating an example of an image after downsampling.

DESCRIPTION OF EMBODIMENTS

Hereinafter, the exemplary embodiments of the present invention will be described with reference to the accompanying drawings.

Exemplary Embodiment 1

Figure 1:
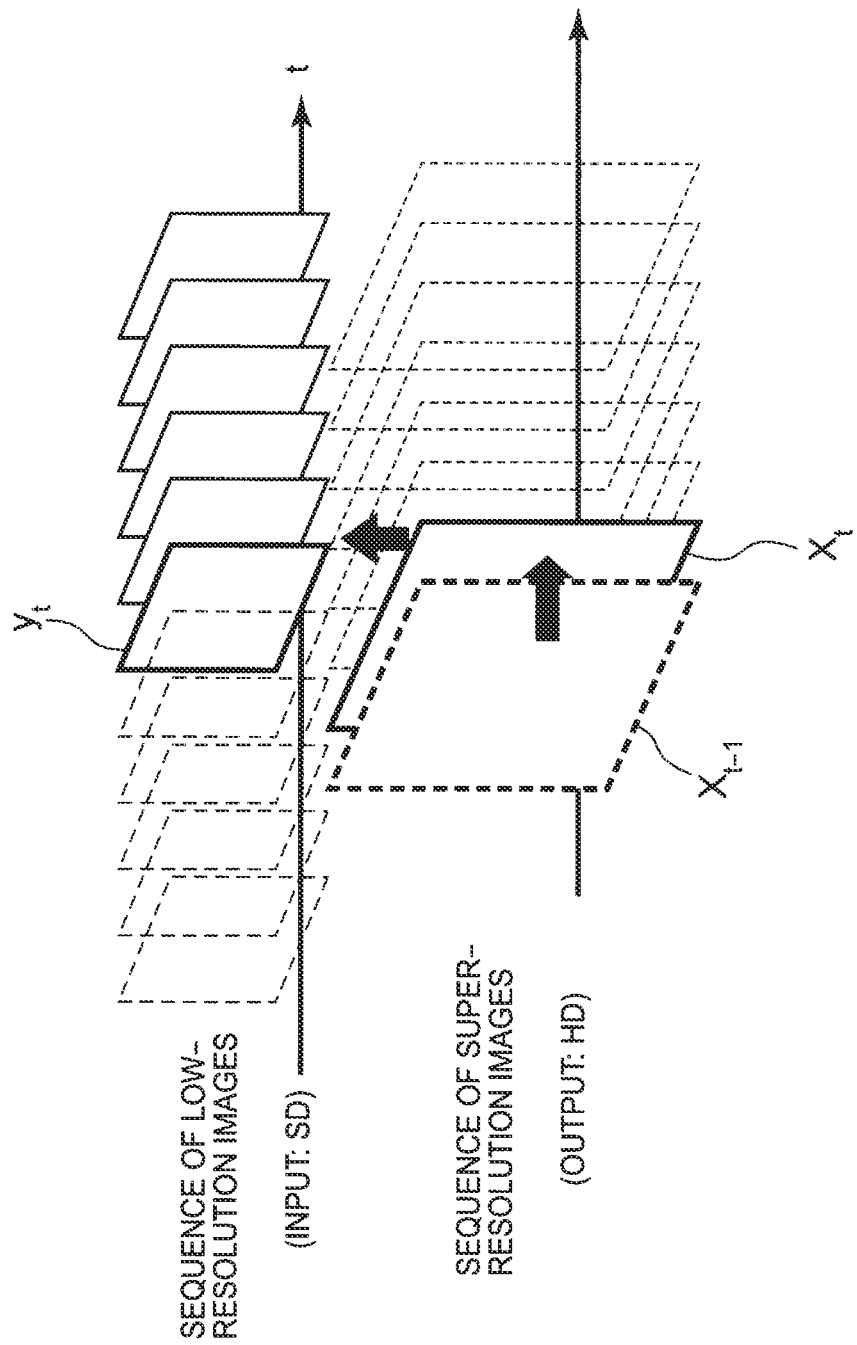
FIG. 1 is an explanatory diagram illustrating a relationship between an input low-resolution image and an output super-resolution image in the present invention.

FIG. 1 is an explanatory diagram illustrating a relationship between an input low-resolution image and an output super-resolution image in the present invention. The image processing system of the present invention receives an input of a sequence of low-resolution images and outputs a sequence of super-resolution images obtained by super-resolution processing. The image processing system according to the present invention receives, for example, an input of SD-resolution images and outputs HD-resolution images. The SD and HD are illustrations of resolutions, and images of other resolutions may be input or output from or to the image processing system. Moreover, in the description below, a low-resolution image is represented by y and a super-resolution image is represented by x. The low-resolution image y and the super-resolution image x are pixel values in the respective images stored in a column vector in raster-scan order. In addition, each of the symbol y representing a low-resolution image and the symbol x representing a super-resolution image has a suffix representing a frame. Further, the current frame to be processed is represented by t and the previous frame thereof is represented by t−1.

A relationship between the super-resolution image $x_t$ in the current frame t and the super-resolution image $x_{t-1}$ in the previous frame t−1 is able to be represented by expression (3) described below.

$$x_t = M_{t,t-1} x_{t-1} + w_t \qquad \text{Expression (3)}$$

In expression (3), $M_{t, t-1}$ is a matrix representing a geometric transformation from a super-resolution image $x_{t-1}$ in the frame t−1 to a super-resolution image $x_t$ in the frame t, and $w_t$ is a vector representing a noise (prediction noise) independent of geometric transformation.

Moreover, the relationship between the low-resolution image $y_t$ and the super-resolution image $x_t$ in the current frame t is able to be represented by the following expression (4).

$$y_t = DBx_t + v_t \quad \text{Expression (4)}$$

B is a matrix representing a gradation in generating the low-resolution image $y_t$. D is a matrix representing downsampling in generating the low-resolution image $y_t$. $v_t$ is a vector representing a noise (observation noise).

Figure 3:
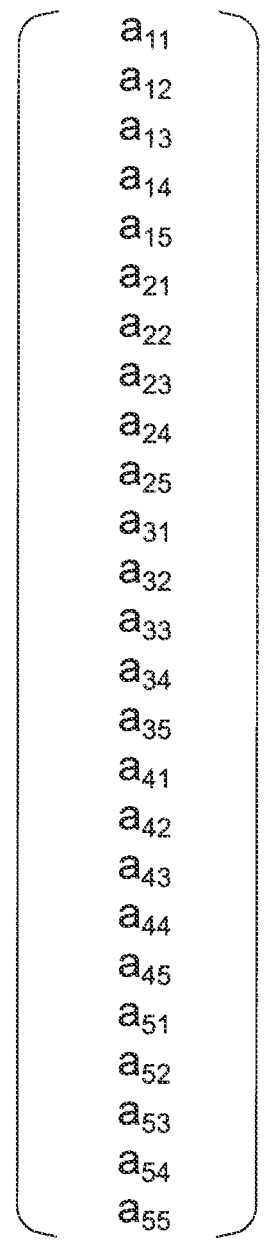
FIG. 3 is an explanatory diagram illustrating a column vector representing the image illustrated in FIG. 2.

An example of simulation of a gradation will be described with reverence to FIGS. 2 to 4. The gradation is able to be simulated by replacing a pixel value with a mean value of the pixel value and the pixel values of the neighboring pixels thereof for each pixel in the image. FIG. 2 illustrates an example of an image to be gradated, illustrating an image of 5×5 pixels. For example, focusing on a pixel having a pixel value $a_{22}$, the pixel value of the focused pixel is replaced with a mean value of the pixel value $a_{22}$ and the pixel values $a_{11}$, $a_{12}$, $a_{13}$, $a_{21}$, $a_{23}$, $a_{31}$, $a_{32}$, and $a_{33}$ of the neighboring pixels thereof. Further, for example, focusing on a pixel having a pixel value $a_{23}$, the pixel value of the focused pixel is replaced with a mean value of the pixel value $a_{23}$ and the pixel values $a_{12}$, $a_{13}$, $a_{14}$, $a_{22}$, $a_{24}$, $a_{32}$, $a_{33}$, and $a_{34}$ of the neighboring pixels thereof. With respect to other pixels, gradation is able to be simulated by replacing the pixel values in the same manner. FIG. 3 is a column vector representing an image illustrated in FIG. 2. FIG. 4 is an example of a matrix B representing a gradation. In FIG. 4, however, only elements of two rows in the matrix B are shown with other rows omitted. In FIG. 4, the first row of the two rows specifically shown is referred to as k-th row and the subsequent row is referred to as (k+1)-th row for descriptive purpose.

The image illustrated in FIG. 2 is able to be represented by a column vector illustrated in FIG. 3. Therefore, as the matrix B by which this column vector is multiplied, the matrix illustrated in FIG. 4 may be used. The k-th row illustrated in FIG. 4 is a matrix component for use in replacement of the pixel value $a_{22}$. Moreover, the (k+1)-th row illustrated in FIG. 4 is a matrix component for use in replacement of the pixel value $a_{23}$. As described in the above, other rows are omitted in FIG. 4. A mean value of the pixels is able to be calculated by multiplying the matrix B illustrated in FIG. 4 by the column vector illustrated in FIG. 3 from the right-hand side of the matrix B. The same applies to the calculation of other rows of the matrix B illustrated in FIG. 4. Therefore, the matrix B representing a gradation may be defined so as to satisfy the following conditions: a first condition is that each row corresponds to each pixel of the image; and a second condition is that, where n is the number of pixels for use in mean calculation, the value of each component of each row is 1/n if the pixel values by which the component is multiplied are the pixel values of the pixel corresponding to the row and the neighboring pixels thereof, and the value of each component of each row is 0 if the pixel values by which the component is multiplied are the pixel values of pixels other than the pixel corresponding to the row and the neighboring pixels thereof. These conditions are illustrative only and the matrix B may be defined so as to satisfy other conditions, for example, by setting the values in each row of the matrix B on the basis of the normal distribution, instead of setting the values in each row of the matrix B to equal values.

Figure 5:
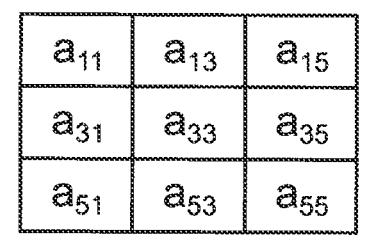
Figure 6:
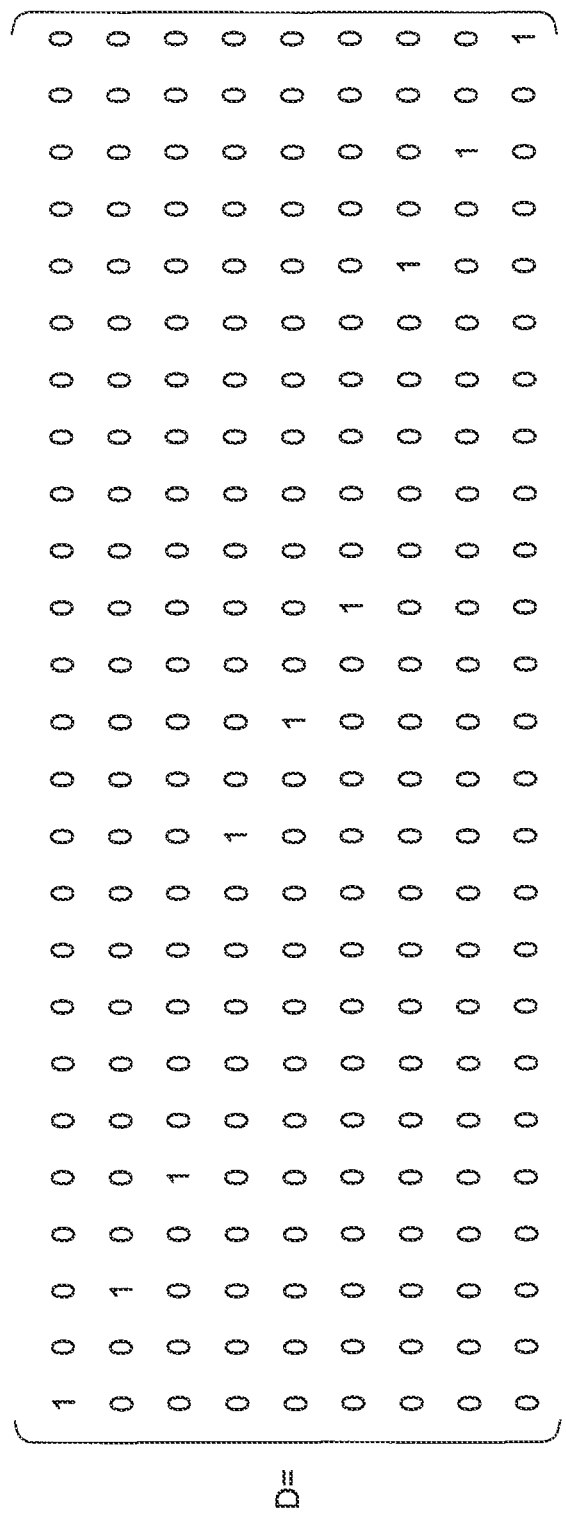
FIG. 6 is an explanatory diagram illustrating an example of a matrix D representing downsampling.

An example of the simulation of downsampling will be described with reference to FIG. 5 and FIG. 6. FIG. 5 is an explanatory diagram illustrating an example of an image obtained after downsampling. FIG. 6 is an example of a matrix D representing downsampling. In this specification, the description will be given taking an example of a case where the image illustrated in FIG. 2 is downsampled to the image illustrated in FIG. 5. In downsampling, the pixel values of the image may be thinned out. For example, by multiplying the matrix D illustrated in FIG. 6 by the column vector in the image illustrated in FIG. 3 from the right-hand side, an image including the pixel values $a_{11}$, $a_{13}$, $a_{15}$, $a_{31}$, $a_{33}$, $a_{35}$, $a_{51}$, $a_{53}$, and $a_{55}$ (see FIG. 5) can be obtained. Therefore, the matrix D representing downsampling may be defined so as to satisfy, for example, the following conditions: a first condition is that each row corresponds to each pixel of the image after downsampling; and a second condition is that the value of each component of each row is 1 if the pixel value by which the component is multiplied is the pixel value of a pixel remains after the downsampling and the value of each component is 0 if the pixel value of a pixel is removed due to thinning. These conditions are illustrative only and the matrix D may be defined so as to satisfy other conditions.

Assuming that $y_t$ is "an observation result" and $x_t$ is "a directly unobservable state" in expression (3) and expression (4), expression (3) and expression (4) correspond to a state equation and an observation equation in a state observation model, respectively.

The image processing system of the present invention predicts a super-resolution image in the current frame from the known $x_{t-1}$ (namely, a super-resolution image in the previous frame). Moreover, the image processing system according to the present invention generates a super-resolution image by carrying out an operation using a low-resolution image $y_t$ in the current frame and carrying out a weighted operation using the result of the operation and the prediction result of the super-resolution image. Specifically, the image processing system according to the present invention generates a low-resolution image by performing a simulation for simulating an imaging process in taking a picture of a subject in the real world by a camera for the prediction result of the super-resolution image. Further, the image processing system according to the present invention calculates a difference between the low-resolution image $y_t$ in the current frame and the low-resolution image obtained by the simulation and upsamples the difference. The super-resolution image is generated as a result of the weighted operation between a result of the operation and the prediction result of the super-resolution image.

In the following description, the prediction result of the super-resolution image is represented by $x_p$ and a fixed super-resolution image is represented by $x_r$, with a suffix indicating a frame appended to each. For example, the prediction result of the super-resolution image in the current frame t is represented by $x_{p, t}$ and a super-resolution image fixed in the current frame t is represented by $x_{r, t}$. Moreover, for example, a super-resolution image fixed in the previous frame is represented by $x_{r, t-1}$. The prediction result $x_p$ and the fixed super-resolution image $x_r$ in each frame are also represented by column vectors in which pixel values in the image are arranged in raster-scan order.

In the case of obtaining a low-resolution image by a simulation from the prediction result $x_{p, t}$ of the super-resolution image, for example, transformation corresponding to a gradation and downsampling may be performed for the prediction result $x_{p, t}$. Specifically, a low-resolution image can be obtained simulatively from the prediction result $x_{p, t}$ by calculating $DB_{xp,\,t}$. As has already been described, B denotes a matrix representing a gradation and D denotes a matrix representing downsampling. The following description takes an example in which a low-resolution image is calculated from the prediction result $x_{p,\,t}$ of the super-resolution image by using the matrices B and D. It should be noted here that the method of obtaining the low-resolution image by using the matrices B and D is illustrative only of a simulation and that the low-resolution image may be derived from the prediction result $x_{p,\,t}$ by any other simulation as long as the simulation represents an imaging process of a subject.

As has already been described, it can be said that expression (3) and expression (4) correspond to a state equation and an observation equation in the state observation model, respectively. Moreover, according to the Kalman filter, the state at the current time can be estimated from the state at the previous time and the current observation result in the problem represented in the state space model. The Kalman filter can be used to find the state in the state space model (a super-resolution image) represented by expression (3) and expression (4). Hereinafter, description will be made taking an example in which the Kalman filter is applied to the present invention.

Figure 7:
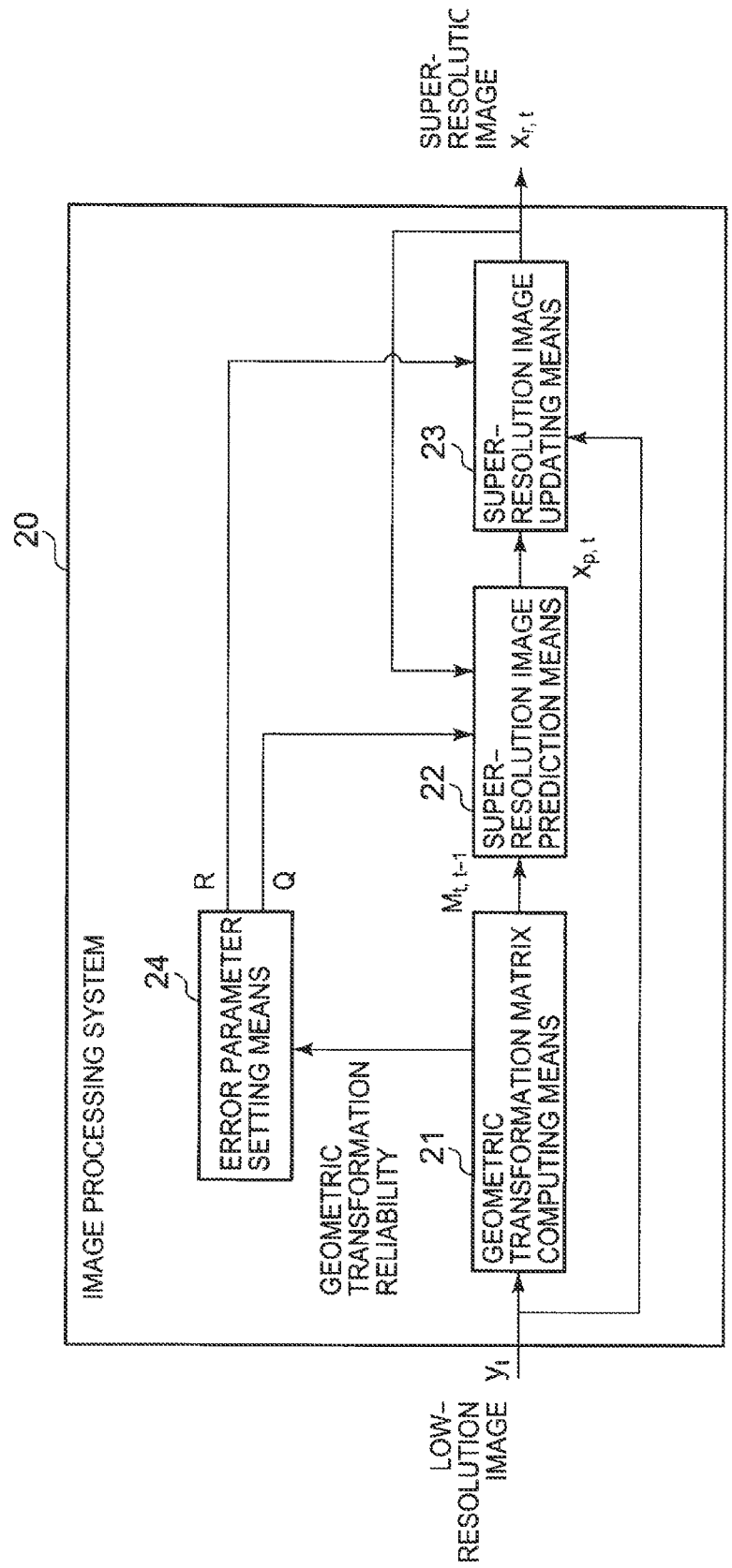
FIG. 7 is a block diagram illustrating an example of an image processing system according to a first exemplary embodiment of the present invention.

FIG. 7 is a block diagram illustrating an example of an image processing system according to a first exemplary embodiment of the present invention. An image processing system 20 according to the first exemplary embodiment includes a geometric transformation matrix computing means 21, a super-resolution image prediction means 22, a super-resolution image updating means 23, and an error parameter setting means 24.

The geometric transformation matrix computing means 21 computes a transformation matrix representing a geometric transformation from the super-resolution image in the previous frame to the super-resolution image in the current frame. Hereinafter, the transformation matrix is referred to as a geometric transformation matrix and denoted by $M_{t,\,t-1}$. Specifically, $M_{t,\,t-1}$ is a transformation matrix for achieving the geometric transformation corresponding to a geometric transformation from a low-resolution image $y_{t-1}$ in the previous frame t-1 to a low-resolution image $y_t$ in the current frame t between super-resolution images. For example, it is assumed that the geometric transformation from the low-resolution image $y_{t-1}$ to the low-resolution image $y_t$ is a translation of five pixels. Furthermore, it is assumed that s is an enlargement factor from the low-resolution image to the super-resolution image. In this case, $M_{t,\,t-1}$ is a transformation matrix for achieving a translation of 5 s pixels.

Moreover, the geometric transformation matrix computing means 21 calculates the level of reliability in the prediction made by using the geometric transformation matrix $M_{t,\,t-1}$. Specifically, the geometric transformation matrix computing means 21 calculates the level of reliability in the prediction result of a super-resolution image in the current frame when predicting the super-resolution image in the current frame by using the geometric transformation matrix $M_{t,\,t-1}$. Hereinafter, the level of reliability can be said to be the level of reliability in the geometric transformation achieved by using $M_{t,\,t-1}$ and therefore is referred to as geometric transformation reliability.

The super-resolution image prediction means 22 generates a prediction $x_{p,\,t}$ of the super-resolution image in the current frame t by transforming the super-resolution image $x_{r,\,t-1}$ generated in the previous frame t-1 by using $M_{t,\,t-1}$ computed by the geometric transformation matrix computing means 21. Furthermore, the super-resolution image prediction means 22 calculates a priori error matrix.

The priori error matrix is an error related to the super-resolution image $x_t$ in the current frame and is a matrix representing an error estimated from a past observation history (in other words, $y_1, y_2, \ldots, y_{t-1}$). Hereinafter, the priori error matrix is denoted by $P_b$ and further a suffix representing a frame is appended to the symbol. The priori error matrix $P_{b,\,t}$ in the current frame t represents an error related to $x_t$ estimated from the respective low-resolution images from $y_1$ to $y_{t-1}$.

The super-resolution image prediction means 22 may calculate the priori error matrix $P_{b,\,t}$ in the current frame t according to the following expression (5).

$$P_{b,t} = M_{t,t-1} P_{a,t-1} M_{t,t-1}^T + Q \qquad \text{Expression (5)}$$

In expression (5), $M_{t,\,t-1}^T$ is a transposed matrix of $M_{t,\,t-1}$. Moreover, Q is a covariance matrix representing a normal distribution related to a prediction noise $w_t$ in expression (3). The covariance matrix Q can be said to be a parameter for calculating the priori error matrix $P_{b,\,t}$. The covariance matrix Q is set by the error parameter setting means 24 on the basis of the geometric transformation reliability.

The super-resolution image updating means 23 performs a simulation for the prediction result of $x_{p,\,t}$ of the super-resolution image to simulatively compute the low-resolution image in the current frame t. Moreover, the super-resolution image updating means 23 calculates a difference between the low-resolution image $y_t$ in the current frame t and the low-resolution image obtained by the simulation. In addition, the super-resolution image updating means 23 calculates a Kalman gain and calculates a weighted mean between the difference and $x_{p,\,t}$ by using the calculated difference, the Kalman gain, and the prediction result $x_{p,\,t}$ of the super-resolution image. The calculation result is the super-resolution image $x_{r,\,t}$ in the current frame t. Then, in the processing related to the next frame t+1, $x_{r,\,t}$ is used when the super-resolution image prediction means 22 generates the prediction $x_{p,\,t+1}$ of the super-resolution image in the frame t+1. Further, the super-resolution image updating means 23 calculates a posterior error matrix.

The posterior error matrix is an error related to the super-resolution image $x_t$ in the current frame and is a matrix representing an error estimated from a past observation history (in other words, $y_1, y_2, \ldots, y_{t-1}$) and the low-resolution image $y_t$ in the current frame t. Hereinafter, the posterior error matrix is denoted by $P_a$ and further a suffix representing a frame is appended to the symbol. The posterior error matrix $P_{a,\,t}$ in the current frame t represents an error related to $x_t$ estimated from the respective low-resolution images from $y_1$ to $y_t$. Moreover, the posterior error matrix $P_{a,\,t-1}$ in the previous frame represents an error related to $x_t$ estimated from the respective low-resolution images from $y_1$ to $y_{t-1}$. A method of calculating the posterior error matrix will be described later.

The super-resolution image updating means 23 may calculate the Kalman gain Kt by calculating the following expression (6), assuming that $K_t$ is the Kalman gain in the current frame t.

$$K_t = P_{b,t}^T (DB)^T (DB P_{b,t}^T (DB)^T + R)^{-1} \qquad \text{Expression (6)}$$

In expression (6), $P_{b,\,t}^T$ is a transposed matrix of $P_{b,\,t}$ and similarly $(DB)^T$ is a transposed matrix of (DB). Moreover, "-1" in expression (6) represents an inverse matrix. Further, R is a covariance matrix representing a normal distribution related to an observation noise $v_t$ in expression (4). The covariance matrix R can be said to be a parameter for calculating the Kalman gain $K_t$. The covariance matrix R is set by the error parameter setting means 24 on the basis of the geometric transformation reliability. In addition, B is a matrix representing a gradation and D is a matrix representing downsampling.

The error parameter setting means 24 sets a covariance matrix Q representing the normal distribution related to the prediction noise $w_t$ and a covariance matrix R representing the normal distribution related to the prediction noise $v_t$ on the basis of the geometric transformation reliability computed by the geometric transformation matrix computing means 21. In other words, the error parameter setting means 24 sets the parameter Q used to calculate the priori error matrix $P_{b,t}$ and a parameter R used to calculate the Kalman gain $K_t$ on the basis of the geometric transformation reliability.

The geometric transformation matrix computing means 21, the super-resolution image prediction means 22, the super-resolution image updating means 23, and the error parameter setting means 24 are achieved by, for example, the CPU of a computer operating according to a program for image processing. For example, the CPU reads the program for image processing stored in a program storage means (not illustrated) of the computer, and the CPU operates as the geometric transformation matrix computing means 21, the super-resolution image prediction means 22, the super-resolution image updating means 23, and the error parameter setting means 24 according to the program. Moreover, the geometric transformation matrix computing means 21, the super-resolution image prediction means 22, the super-resolution image updating means 23, and the error parameter setting means 24 may be achieved as circuits separate from one another.

Figure 8:
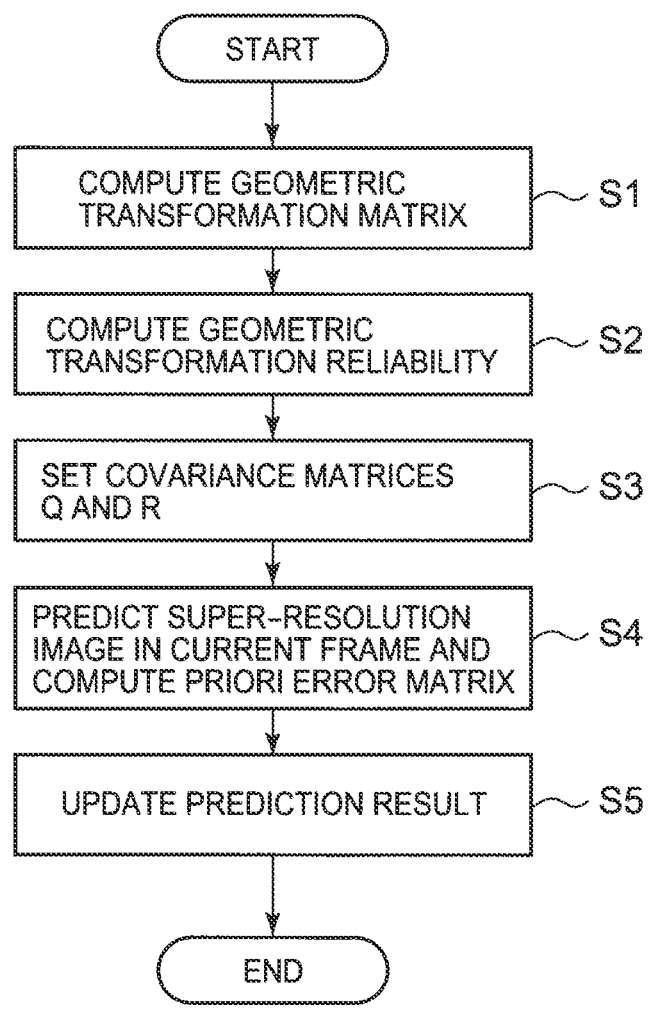
FIG. 8 is a flowchart illustrating an example of processing steps in the first exemplary embodiment.

The following describes the operations. FIG. 8 is a flowchart illustrating an example of processing steps in the first exemplary embodiment. The image processing system 20 receives an input of low-resolution images constituting a low-resolution moving image in order of time. Upon an input of a low-resolution image $y_t$ in the current frame t to be processed, the geometric transformation matrix computing means 21 computes a geometric transformation matrix $M_{t,t-1}$ (step S1).

In step S1, the geometric transformation matrix computing means 21 computes the geometric transformation matrix $M_{t,t-1}$ by using the low-resolution image $y_{t-1}$ in the frame previous to the current frame and the low-resolution image $y_t$ in the current frame t. At this time, the geometric transformation matrix computing means 21 enlarges the low-resolution images $y_{t-1}$ and $y_t$ to images of the same number of pixels as that of the super-resolution image. In other words, the geometric transformation matrix computing means 21 enlarges the low-resolution images $y_{t-1}$ and $y_t$ to the images at an enlargement factor from the low-resolution image to the high-resolution image. The enlargement process may be performed by using, for example, bilinear interpolation or bicubic interpolation. An image obtained by enlarging the low-resolution image $y_{t-1}$ is denoted by $Y_{t-1}$ and an image obtained by enlarging the low-resolution image $y_t$ is denoted by $Y_t$. It can be considered here that $Y_{t-1}$ is approximate to the super-resolution image in the frame t−1 and $Y_t$ is approximate to the super-resolution image in the current frame t, and the geometric transformation matrix computing means 21 computes a transformation matrix representing a geometric transformation from $Y_{t-1}$ to $Y_t$ as $M_{t,t-1}$.

Moreover, the geometric transformation matrix computing means 21 may find $M_{t,t-1}$ which minimizes a difference between a result of transforming $Y_{t-1}$ by using $M_{t,t-1}$ and $Y_t$. Specifically, the geometric transformation matrix computing means 21 may change $M_{t,t-1}$ to identify $M_{t,t-1}$ that minimizes the value of the following expression (7).

[Math. 1]

$$\|M_{t,t-1}Y_{t-1}-Y_t\|^2 \qquad \text{Expression (7)}$$

This method is referred to as a gradient-based method. It should be noted that the method of computing $M_{t,t-1}$ described here is illustrative only and $M_{t,t-1}$ may be calculated in any other method.

Subsequently, the geometric transformation matrix computing means 21 computes geometric transformation reliability (step S2). An example of a method of computing the geometric transformation reliability will be described below. The geometric transformation matrix computing means 21 may set the geometric transformation reliability so that the geometric transformation reliability decreases as a difference between the result of transforming $Y_{t-1}$ by using the geometric transformation matrix $M_{t,t-1}$ and the reference image $Y_t$ increases and the geometric transformation reliability becomes higher as the difference decreases, with the image $Y_t$ corresponding to the current frame as a reference, out of the images $Y_{t-1}$ and $Y_t$ enlarged from the low-resolution images at the time of the computation of $M_{t,t-1}$. For example, assuming that Y' is the result of transforming $Y_{t-1}$ by using the geometric transformation matrix $M_{t,t-1}$, the geometric transformation matrix computing means 21 may calculate the absolute value of a difference between the pixel values (luminance values) with respect to the corresponding pixels of Y' and the reference image $Y_t$, calculate the inverse number of the mean value in the entire image of the absolute value, and consider the value to be geometric transformation reliability. The method of computing the geometric transformation reliability is illustrative only, and the geometric transformation matrix computing means 21 may compute the geometric transformation reliability in any other method.

After computing the geometric transformation reliability, the error parameter setting means 24 sets the covariance matrix Q representing the normal distribution related to the prediction noise $w_t$ and the covariance matrix R representing the normal distribution related to the observation noise $v_t$ according to the geometric transformation reliability (step S3).

In step S3, the error parameter setting means 24 sets the covariance matrices Q and R so that the values of the respective components of Q decrease and the values of the respective components of R increase as the geometric transformation reliability increases and the values of the respective components of Q increase and the values of the respective components of R decrease as the geometric transformation reliability becomes lower. Here, the term "respective components of Q" means all components of Q. Similarly, the term "respective components of R" means all components of R.

An example of the settings of Q and R according to the geometric transformation reliability will be described. Hereinafter, the geometric transformation reliability is represented by r. In addition, it is assumed that the geometric transformation reliability r is normalized so as to be a value within the range of 0 to 1. The normalization of the geometric transformation reliability r may be performed by, for example, the geometric transformation matrix computing means 21. Alternatively, the normalization may be performed by the error parameter setting means 24. The error parameter setting means 24 derives a new covariance matrix Q by calculating the following expression (8) for Q computed in the previous frame. Specifically, the error parameter setting means 24 considers a result of multiplying Q computed in the previous frame by (1−r) as new Q.

$$Q \leftarrow (1-r) \times Q \qquad \text{Expression (8)}$$

Similarly, the error parameter setting means 24 derives a new covariance matrix R by calculating the following expression (9) for R computed in the previous frame. Specifically, the error parameter setting means 24 considers a result of multiplying R computed in the previous frame by r as new R.

$$R \leftarrow r \times R \qquad \text{Expression (9)}$$

In addition, in preparation for carrying out the operations of expression (8) and expression (9) for the first time, the initial values of Q and R may be set beforehand. Then, the initial values of Q and R may be used at the time of carrying out the operations of expression (8) and expression (9) for the first time.

Subsequently, the super-resolution image prediction means 22 generates the prediction $x_{p,t}$ of the super-resolution image in the current frame t by transforming the super-resolution image $x_{t,t-1}$ generated in the previous frame t–1 by using the geometric transformation matrix $M_{t,t-1}$ (step S4). Concretely, as illustrated in the following expression (10), the super-resolution image prediction means 22 generates the prediction $x_{p,t}$ of the super-resolution image by carrying out an operation of multiplying the geometric transformation matrix $M_{t,t-1}$ by the column vector representing the super-resolution image $x_{r,t-1}$ from the right-hand side.

$$x_{p,t} = M_{t,t-1} x_{r,t-1} \qquad \text{Expression (10)}$$

Moreover, when generating $x_{p,t}$ in step S4, the super-resolution image prediction means 22 also calculates a priori error matrix $P_{b,t}$. In step S4, the super-resolution image prediction means 22 may calculate the priori error matrix $P_{b,t}$ in the current frame t according to the aforementioned expression (5). It should be noted, however, that the super-resolution image prediction means 22 computes $P_{b,t}$ by using the covariance matrix Q, which has been set by the error parameter setting means 24 in step S3, when computing $P_{b,t}$ in the calculation of expression (5).

Figure 9:
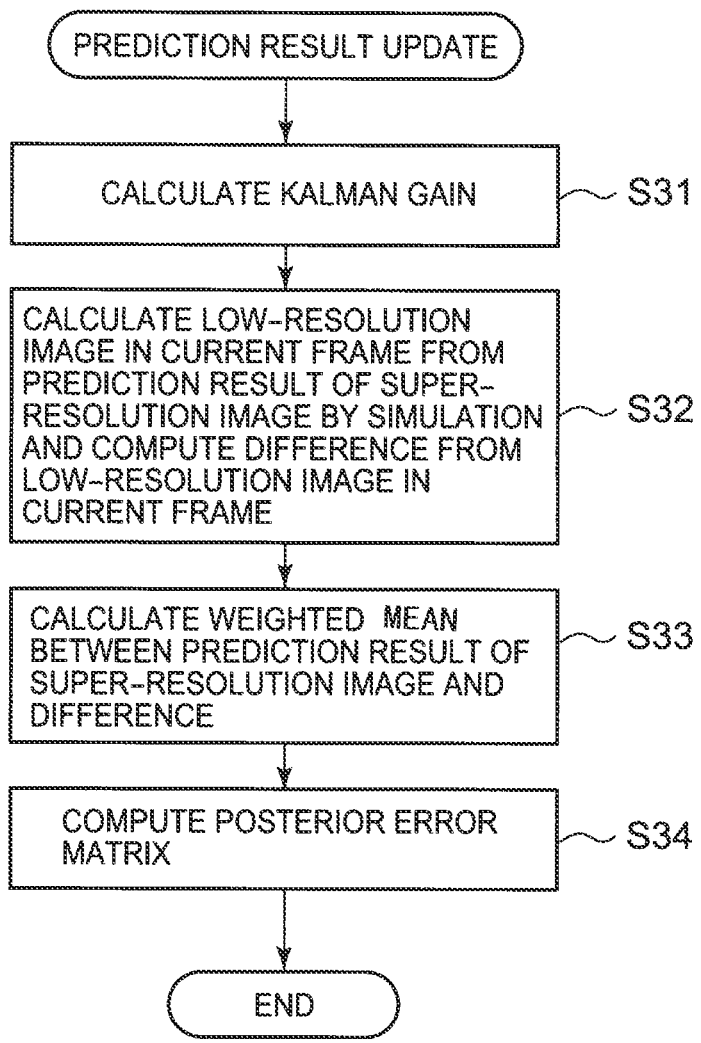
FIG. 9 is a flowchart illustrating an example of the processing steps of updating the prediction result of a super-resolution image (step S5) in the first exemplary embodiment.

Subsequent to step S4, the super-resolution image updating means 23 calculates the super-resolution image $x_{r,t}$ in the current frame by updating the prediction result $x_{p,t}$ of the super-resolution image calculated in step S4 (step S5). FIG. 9 is a flowchart illustrating an example of the processing steps of updating the prediction result of the super-resolution image (step S5) in the first exemplary embodiment.

In step S5, the super-resolution image updating means 23 calculates a Kalman gain $K_t$ in the current frame t, first (step S31). In step S31, the super-resolution image updating means 23 may calculate the Kalman gain $K_t$ in the current frame t by calculating the aforementioned expression (6). Note that, however, when computing $K_t$ in the calculation of expression (6), the super-resolution image updating means 23 computes $K_t$ by using the covariance matrix R, which has been set by the error parameter setting means 24 in step S3.

In addition, B used in expression (6) is a matrix representing a gradation and D is a matrix representing downsampling. These matrices B and D are the same as those used to simulate the prediction result of the super-resolution image in step S32 described later.

After step S31, the super-resolution image updating means 23 generates a low-resolution image in the current frame by a simulation from the prediction result $x_{p,t}$ of the super-resolution image in the current frame t, which has been calculated in step S4 (See FIG. 8). Thereafter, the super-resolution image updating means 23 calculates a difference between the low-resolution image $y_t$ actually input in the current frame and the low-resolution image generated from $x_{p,t}$ by a simulation (step S32). In this example, the super-resolution image updating means 23 finds a low-resolution image by calculating $DBx_{p,t}$ by a simulation using the matrix B representing a gradation and the matrix D representing downsampling. Then, the super-resolution image updating means 23 may find the difference from $y_t$ by calculating $(y_t - DBx_{p,t})$.

Subsequently, the super-resolution image updating means 23 calculates the super-resolution image $x_{r,t}$ in the current frame by calculating a weighted mean between the prediction result $x_{p,t}$ of the super-resolution image in the current frame t and the difference $(y_t - DBx_{p,t})$ calculated in step S32 (step S33). Concretely, the super-resolution image updating means 23 may calculate the following expression (11) by using the Kalman gain $K_t$ calculated in step S31.

$$x_{r,t} = x_{p,t} + K_t (y_t - DBx_{p,t}) \qquad \text{Expression (11)}$$

In expression (11), the Kalman gain $K_t$ is a matrix for performing upsampling and weighting for $(y_t - DBx_{p,t})$. The weighted sum represented by expression (11) is one aspect of the calculation of a weighted mean between $x_{p,t}$ and $(y_t - DBx_{p,t})$.

In addition, the Kalman gain $K_t$ is calculated by using the covariance matrices Q and R, and therefore the geometric transformation reliability is reflected on the Kalman gain $K_t$.

After step S33, the super-resolution image updating means 23 calculates the posterior error matrix $P_{a,t}$ in the current frame t (step S34). The super-resolution image updating means 23 may compute $P_{a,t}$ by calculating the following expression (12).

$$P_{a,t} = (I - K_t DB) P_{b,t} \qquad \text{Expression (12)}$$

In expression (12), I is a unit matrix.

The super-resolution image updating means 23 passes the $x_{r,t}$ and $P_{a,t}$ calculated in the current frame t to the super-resolution image prediction means 22. In step S4 of the next frame t+1, processing is performed by using the value $x_{r,t}$ for the super-resolution image in the previous frame. Further, in step S33 of the next frame t+1, the value $P_{a,t}$ is used to calculate the priori error matrix $P_{b,t+1}$.

The image processing system 20 performs the processes of steps S1 to S5 every time a low-resolution image in each frame is input. As a result, a super-resolution image is obtained for each frame. Further, the sequence of super-resolution images in the respective frames is a super-resolution moving image. Therefore, the image processing system 20 is able to generate a super-resolution dynamic image from a low-resolution dynamic image. The image processing system 20 outputs the super-resolution images in the frame order.

According to the exemplary embodiment, in step S1, the geometric transformation matrix computing means 21 enlarges the low-resolution images $y_{t-1}$ and $y_t$ to images $Y_{t-1}$ and $Y_t$ of the same number of pixels as that of the super-resolution image, computes the transformation matrix representing a geometric transformation from $Y_{t-1}$ to $Y_t$ as $M_{t,t-1}$, and calculates geometric transformation reliability. If the value of the geometric transformation reliability is small, the level of reliability in the transformation is low, which indicates that the registration of the images is unsuccessful. Contrary to this, if the value of the geometric transformation reliability is large, the level of reliability in the transformation is high, which indicates that the registration of the images is successful. In this exemplary embodiment, the error parameter setting means 24 sets the covariance matrices Q and R on the basis of the geometric transformation reliability. Then, the super-resolution image prediction means 22 calculates the priori error matrix $P_{b,t}$ by using the covariance matrix Q and the super-resolution image updating means 23 calculates the Kalman gain by using the priori error matrix $P_{b,t}$ and the covariance matrix R. Further, the super-resolution image updating means 23 calculates the super-resolution image $x_{r,t}$ in the current frame by using the Kalman gain. Therefore, even in the case of unsuccessful registration of the images $Y_{t-1}$ and $Y_t$, the image processing system 20 sets the parameters Q and R responding to the case and calculates the super-resolution image $x_{r,t}$, thereby preventing a decrease in the image quality of the super-resolution images.

Specifically, while the super-resolution image updating means 23 calculates the Kalman gain as a matrix for performing weighting for each frame, the geometric transformation reliability is reflected on the Kalman gain. As a result, an appropriate weight is set for each frame, thereby enabling an improvement in the image quality of super-resolution images.

More specifically, the image processing system 20 is able to increase a weight on the low-resolution image $y_t$, which has been input in the current frame t, in the case of low reliability in the prediction of the super-resolution image using the geometric transformation matrix $M_{t,\,t-1}$. Contrarily in the case of high reliability in the prediction of the super-resolution image using the geometric transformation matrix $M_{t,\,t-1}$, the image processing system 20 is able to increase a weight on the prediction result $x_{p,\,t}$ of the super-resolution image. As a result, the super-resolution image can be prevented from being broken even in the case of a failure in the prediction of the super-resolution image using the geometric transformation matrix $M_{t,\,t-1}$.

Moreover, in the present invention, the super-resolution image updating means 23 updates the prediction result of the super-resolution image in the current frame t in step S33 by using the difference calculated in step S32. Therefore, the accuracy of the super-resolution image can be increased. Concretely, in the case where the super-resolution image is reduced in size so as to be a low-resolution image, the obtained low-resolution image has only a little difference from an original low-resolution image. This means that the generated super-resolution image is highly accurate.

A first frame (the beginning frame) in an image sequence is preceded by no frame. Therefore, with respect to the first frame, an image obtained by upsampling a low-resolution image in the first frame to the same number of pixels as the number of pixels of the super-resolution image is considered to be a super-resolution image and the processing illustrated in FIG. 8 may be performed from a second frame. In this instance, in calculating expression (5) with respect to the second frame, the posterior error matrix $P_{a,\,1}$ in the first frame may be assumed to be a unit matrix, for example.

Moreover, the same image as the low-resolution image in the first frame may be used as a low-resolution image in the frame previous to the first frame and an image obtained by upsampling the low-resolution image in the first frame may be considered as a super-resolution image in the frame previous to the first frame to perform the processing illustrated in FIG. 8 from the first frame. Also in this instance, the posterior error matrix in the frame previous to the first frame may be assumed to be, for example, a unit matrix.

Moreover, like immediately after a scene change, the image in the current frame t may be completely different from the image in the previous frame t−1 in some cases. In this case, the error parameter setting means 24 may set all of the components of the covariance matrix Q related to a prediction noise to zero and the image processing system 30 may generate a super-resolution image only from the low-resolution image in the current frame t. In this case, the super-resolution image prediction means 22 can use the image obtained by enlarging the low-resolution image in the current frame t as the prediction of the super-resolution image in the current frame t. Other operations are the same as those of the first exemplary embodiment described above.

Determination of whether there is a scene change may be made by determining whether the geometric transformation reliability is equal to or lower than a preset threshold value. The threshold value may be set as a small value such that the value equal to or lower than the threshold value can be considered to be zero. Then, for example, the error parameter setting means 24 may determine that a scene change occurs if the geometric transformation reliability is equal to or lower than the threshold value and determine that no scene change occurs if the geometric transformation reliability is higher than the threshold value.

Moreover, as another method of determining a scene change, a method described below may be used. For example, the error parameter setting means 24 determines an absolute value of a difference between corresponding pixels for each pixel in the low-resolution image in the current frame t and the low-resolution image in the previous frame t−1. The error parameter setting means 24 may determine that a scene change occurs if the total sum of the absolute values of the differences, which have been found with respect to the entire image (all pixels), is equal to or greater than the threshold value and may determine that a scene change does not occur if the total sum of the absolute values of the differences is smaller than the threshold value.

Although the error parameter setting means 24 determines whether the scene change occurs as an example in the above, any other constituent element may be used to determine whether a scene change occurs.

Moreover, if the current frame t is determined to be located immediately after a scene change, the processing is not performed from a past frame as to processing order, but may be performed from a later frame to an earlier frame in terms of time to generate a super-resolution image. Specifically, the image processing system according to the present invention may generate the super-resolution image in the current frame t by predicting the super-resolution image in the current frame t on the basis of a geometric transformation from the super-resolution image in the frame t+1 preceding in terms of time and updating the prediction result on the basis of the input low-resolution image $y_t$.

Subsequently, a variation of the first exemplary embodiment will be described. The above has described a case where the Kalman filter is used to find the states (super-resolution images) in a state space model represented by expression (3) and expression (4). Any other filter may be used, instead of the Kalman filter. For example, a particle filter described in the following reference and the like may be used.

[Reference]M. Sanjeev Arulampalam, Simon Maskell, Neil Gordon, Tim Clapp, "A Tutorial on Particle Filters for Online Nonlinear/Non-Gaussian Bayesian Tracking," IEEE Transactions on Signal Processing Vol. 50, No. 2, pp. 174-188, 2002.

Moreover, in the above example, there has been described a case of multiplying a difference ($y_t$−DBxp, t) between a low-resolution image $y_t$ in the current frame t and a low-resolution image $DBx_{p,\,t}$, which has been found by a simulation from $x_{p,\,t}$, by a matrix (for example, a Kalman gain $K_t$) for use in performing upsampling and weighting. The matrix for use in upsampling and weighting may be other than the Kalman gain $K_t$.

Exemplary Embodiment 2

In the first exemplary embodiment, there has been described a case of performing a weighting calculation using a Kalman gain. In a second exemplary embodiment, a super-resolution image $x_{r,t}$ in the current frame is calculated by calculating the following expression (13), instead of expression (11), by using geometric transformation reliability, which is a scalar, as a weight coefficient.

$$x_{r,t} = r \times x_{p,t} + (1-r)U(y_t - DBx_{p,t}) \qquad \text{Expression (13)}$$

In expression (13), r is geometric transformation reliability. Note that, however, the geometric transformation reliability r is assumed to be normalized so as to have a value within the range of 0 to 1. U is a matrix representing that $(y_t - DBx_{p,t})$ is upsampled to the same number of pixels as that of the super-resolution image by, for example, bilinear interpolation, bicubic interpolation, or the like.

Figure 10:
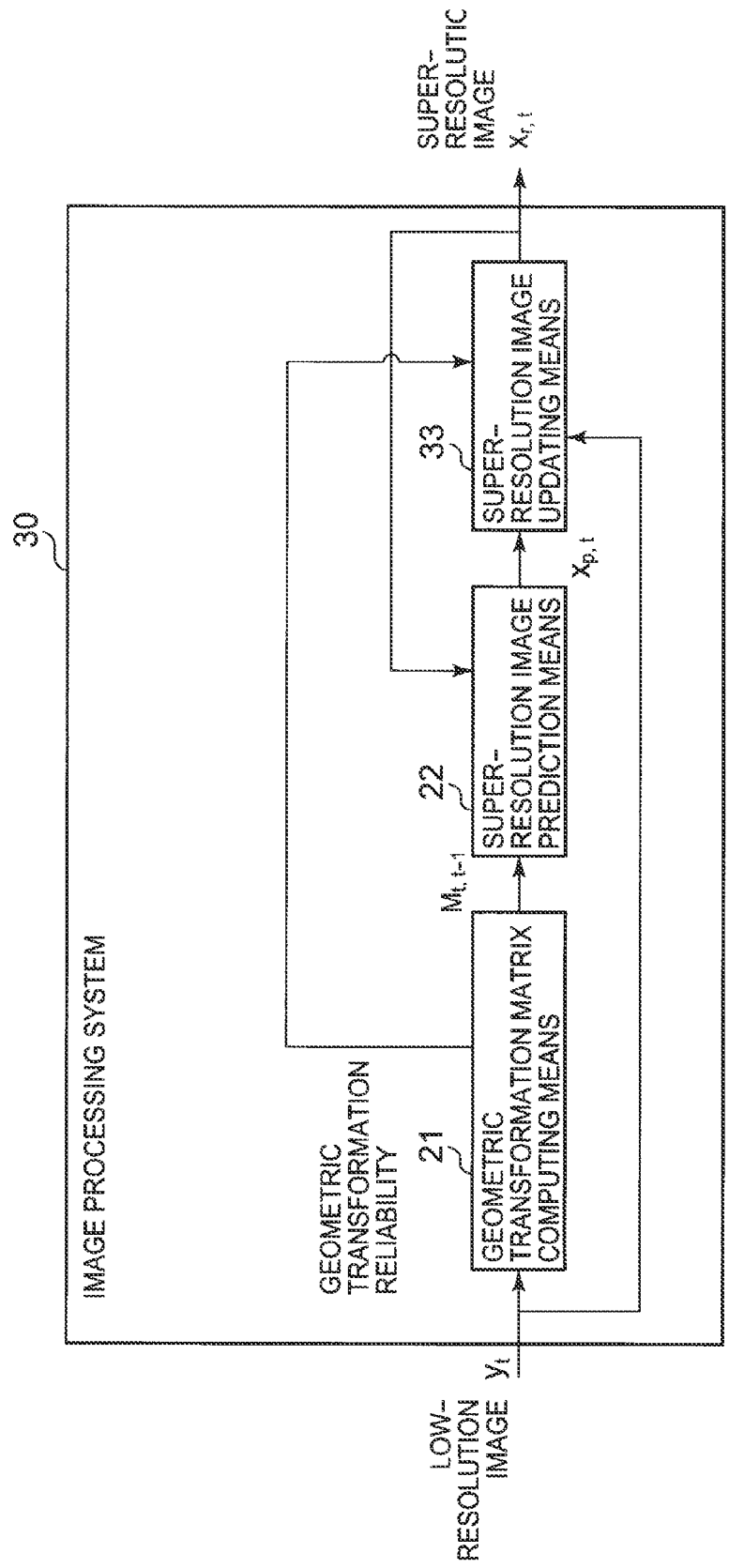
FIG. 10 is a block diagram illustrating an example of an image processing system according to a second exemplary embodiment of the present invention.

FIG. 10 is a block diagram illustrating an example of an image processing system according to the second exemplary embodiment of the present invention. The image processing system 30 according to the second exemplary embodiment includes a geometric transformation matrix computing means 21, a super-resolution image prediction means 22, and a super-resolution image updating means 33. The same constituent elements as those of the first exemplary embodiment are denoted by the same reference numbers as those of FIG. 7 and detailed description will be omitted. Note that, however, the super-resolution image prediction means 22 does not compute a priori error matrix. Moreover, in this exemplary embodiment, there is not provided with the error parameter setting means 24 and the geometric transformation matrix computing means 21 inputs calculated geometric transformation reliability to the super-resolution image updating means 33.

The super-resolution image updating means 33 performs a simulation of a prediction result $x_{p,t}$ of a super-resolution image and simulatively computes a low-resolution image in the current frame t. Furthermore, the super-resolution image updating means 33 calculates a difference between the low-resolution image $y_t$ in the current frame t and the low-resolution image obtained by the simulation. This processing is the same as the processing of the super-resolution image updating means 23 in the first exemplary embodiment. Note that, however, the super-resolution image updating means 33 performs the calculation of the weighted mean described in the above expression (13) with the geometric transformation reliabilitys r and (1−r) as weight coefficients, in the case of calculating the super-resolution image $x_{r,t}$ in the current frame t by calculating the weighted mean between the calculated difference and the prediction result $x_{p,t}$ of the super-resolution image in the current frame.

Therefore, in this exemplary embodiment, the super-resolution image updating means 33 does not compute the posterior error matrix and the Kalman gain.

The geometric transformation matrix computing means 21, the super-resolution image prediction means 22, and the super-resolution image updating means 33 are achieved by, for example, the CPU of a computer operating according to a program for image processing. For example, the CPU reads the program for image processing stored in a program storage means (not illustrated) of the computer, and the CPU operates as the geometric transformation matrix computing means 21, the super-resolution image prediction means 22, and the super-resolution image updating means 33 according to the program. Moreover, the geometric transformation matrix computing means 21, the super-resolution image prediction means 22, and the super-resolution image updating means 33 may be achieved as circuits separate from one another.

Figure 11:
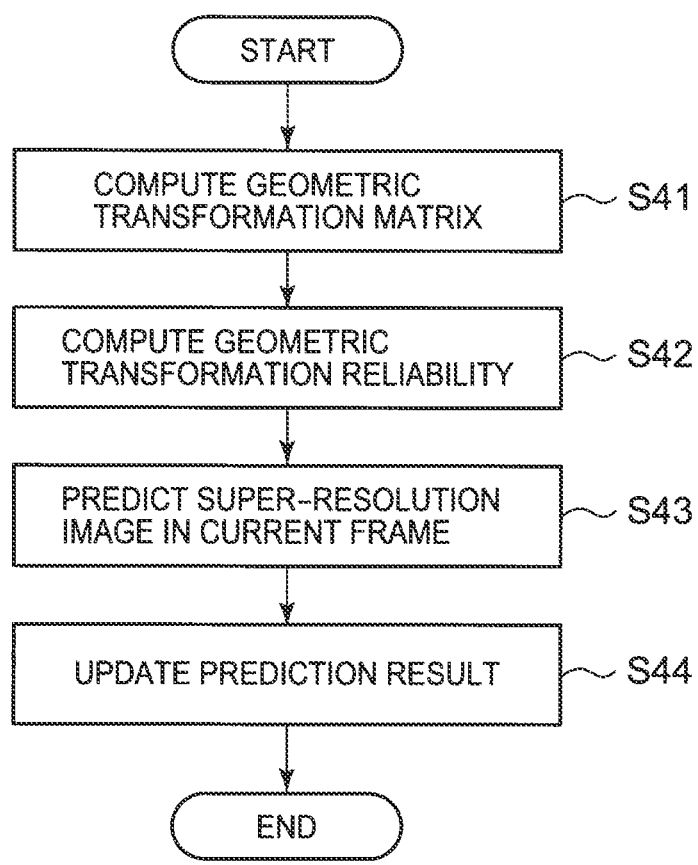
FIG. 11 is a flowchart illustrating an example of processing steps in the second exemplary embodiment.

The following describes the operations of this exemplary embodiment. FIG. 11 is a flowchart illustrating an example of processing steps in this exemplary embodiment.

The image processing system 30 receives an input of low-resolution images constituting a low-resolution dynamic image in order of time. Upon an input of a low-resolution image in the current frame t to be processed, the geometric transformation matrix computing means 21 computes a geometric transformation matrix $M_{t,t-1}$ (step S41). The operation of step S41 is the same as that of step S1 (See FIG. 8) of the first exemplary embodiment. For example, the geometric transformation matrix computing means 21 generates an image $Y_{t-1}$ obtained by enlarging the low-resolution image $y_{t-1}$ and generates an image $Y_t$ obtained by enlarging the low-resolution image $y_t$ in the same manner as in the first exemplary embodiment. Images $Y_{t-1}$ and $Y_t$ each have the same number of pixels as that of the super-resolution image. In addition, the geometric transformation matrix computing means 21 may identify $M_{t,t-1}$ when the value of the aforementioned expression (7) is the minimum.

Subsequently, the geometric transformation matrix computing means 21 computes geometric transformation reliability (step S42). The operation of step S42 is the same as that of step S2 (See FIG. 8) of the first exemplary embodiment. Specifically, the geometric transformation matrix computing means 21 may set the geometric transformation reliability so that the geometric transformation reliability becomes lower as a difference between the result of transforming $Y_{t-1}$ by using the geometric transformation matrix $M_{t,t-1}$ and the reference image $Y_t$ increases and the geometric transformation reliability becomes higher as the difference decreases, with the image $Y_t$ corresponding to the current frame as a reference, out of the images $Y_{t-1}$ and $Y_t$ enlarged from the low-resolution images at the time of the computation of $M_{t,t-1}$. Note that, however, the geometric transformation matrix computing means 21 normalizes the geometric transformation reliability r so that the value of the geometric transformation reliability r is within the range of 0 to 1. The geometric transformation matrix computing means 21 inputs the calculated geometric transformation reliability to the super-resolution image updating means 33. Subsequently, the super-resolution image prediction means 22 generates the prediction $x_{p,t}$ of the super-resolution image in the current frame t by transforming the super-resolution image $x_{r,t-1}$ generated in the previous frame t−1 by using the geometric transformation matrix $M_{t,t-1}$ (step S43). The operation of step S43 is the same as the operation of generating $x_{p,t}$ in step S4 (See FIG. 8). Specifically, the super-resolution image prediction means 22 may find the prediction $x_{p,t}$ of the super-resolution image in the current frame t by calculating the aforementioned expression (10).

Figure 12:
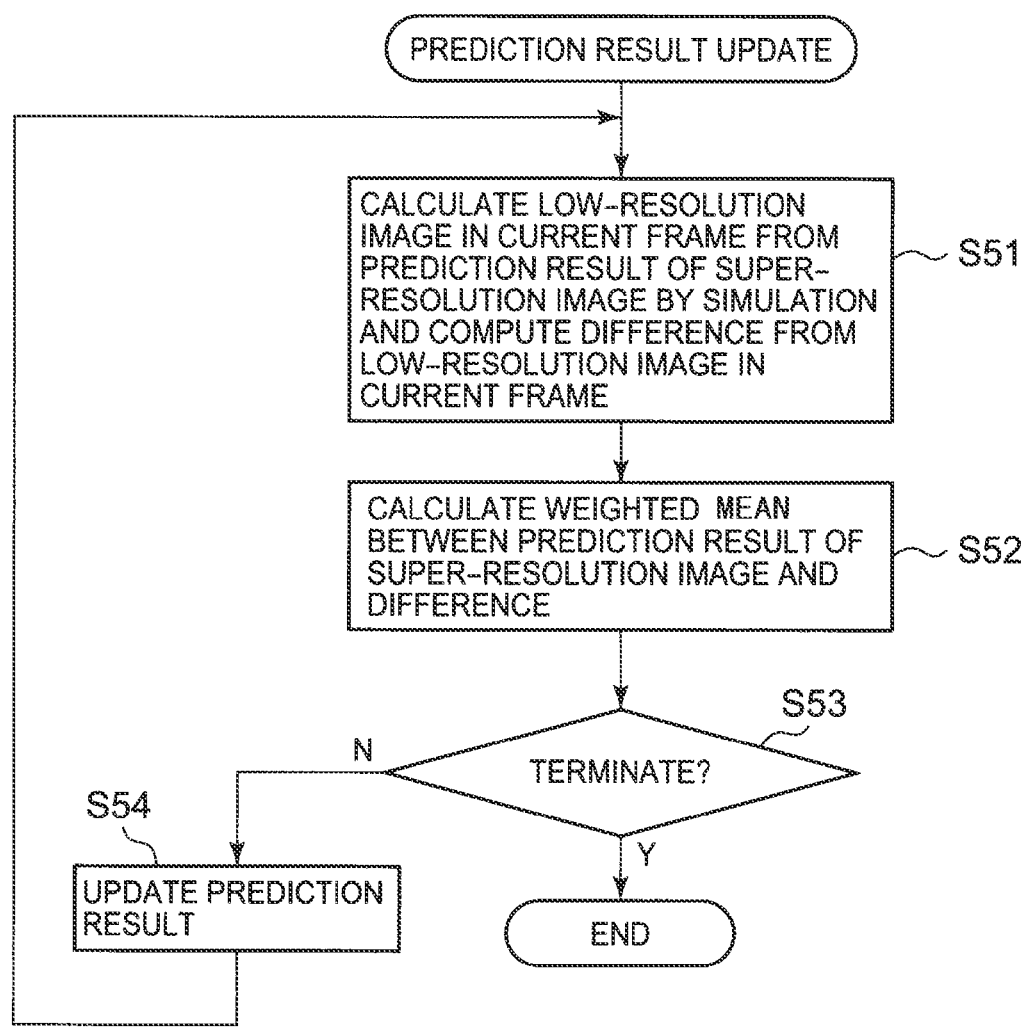
FIG. 12 is a flowchart illustrating an example of the processing steps of updating the prediction result of a super-resolution image (step S44) in the second exemplary embodiment.

Subsequently to step S43, the super-resolution image updating means 33 calculates the super-resolution image $x_{r,t}$ in the current frame by updating the prediction result $x_{p,t}$ of the super-resolution image calculated in step S43 (step S44). The aspect of this operation differs from that of the first exemplary embodiment in the above. FIG. 12 is a flowchart illustrating an example of the processing steps of updating the prediction result of a super-resolution image (step S44) in the second exemplary embodiment.

In the second exemplary embodiment, in step S44, the super-resolution image updating means 33 generates a low-resolution image in the current frame t by a simulation from the prediction result $x_{p,t}$ of the super-resolution image in the current frame t calculated in step S43. Then, the super-resolution image updating means 33 calculates a difference between the low-resolution image $y_t$ actually input in the current frame t and the low-resolution image generated from $x_{p,t}$ by a simulation (step S51). The processing of step S51 is the same as that of step S32 (See FIG. 9) in the first exemplary embodiment. For example, the super-resolution image updating means 33 finds the low-resolution image by calculating $DBx_{p,t}$ by a simulation using a matrix B representing a gradation and a matrix D representing downsampling. Then, the super-resolution image updating means 33 may find the difference from $y_t$ by calculating $(y_t-DBx_{p,t})$.

Subsequently, the super-resolution image updating means 33 calculates a weighted mean between the prediction result $x_{p,t}$ of the super-resolution image in the current frame t and the difference $(y_t-DBx_{p,t})$ calculated in step S51 (step S52). Concretely, the super-resolution image updating means 33 uses the geometric transformation reliability r input to the geometric transformation matrix computing means 21 as a weight coefficient on the $x_{p,t}$ side and uses (1−r) as a weight coefficient on the difference $(y_t-DBx_{p,t})$ side. Note that, however, the number of pixels is different between the $x_{p,t}$ side and the $(y_t-DBx_p, t)$ side and therefore the super-resolution image updating means 33 multiplies $(y_t-DBx_{p,t})$ by U (a matrix representing upsampling) and then multiplies a result thereof by (1−r). The super-resolution image updating means 33 calculates the aforementioned expression (13) by using the weight coefficients r and (1−r) in this manner.

As illustrated in FIG. 12, the super-resolution image updating means 33 performs loop processing of steps S51 to S54. Subsequent to step S52, the super-resolution image updating means 33 determines whether to terminate this loop processing (step S53). For example, the super-resolution image updating means 33 may determine to terminate the loop processing, considering that $x_{r,t}$ has converged if the difference between $x_{r,t}$ found in the immediately preceding step S52 and $x_{r,t}$ found in step S52 in the previous round is equal to or smaller than the threshold value. Further, if the difference between $x_{r,t}$ found in the immediately preceding step S52 and $x_{r,t}$ found in step S52 in the previous round is greater than the threshold value, the super-resolution image updating means 33 may determine to continue the loop processing, considering that $x_{r,t}$ has not converged yet.

If determining to continue the loop processing (N in step S53), the super-resolution image updating means 33 updates the prediction result $x_{p,t}$ of the super-resolution image to $x_{r,t}$ found in the immediately preceding step S52 (step S54). Then, the super-resolution image updating means 33 repeats the loop processing of step S51 and subsequent steps by using the new prediction $x_{p,t}$ of the super-resolution image.

If determining to terminate the loop processing (Y in step S53), the super-resolution image updating means 33 outputs $x_{r,t}$ calculated in the immediately preceding step S52 as the super-resolution image in the current frame t.

The determination of the termination in step S53 may be performed in any other method. For example, the number of times of performing the loop processing of steps S51 to S54 is previously determined. If the number of times of performing the processing of calculating $x_{r,t}$ (step S52) reaches the predetermined number of times, the super-resolution image updating means 33 may determine to terminate the loop processing.

Also in the second exemplary embodiment, the same effects as in the first exemplary embodiment are obtained, by which a highly-accurate super-resolution image can be generated. This means that, if the geometric transformation reliability r is low, the weight of $U(y_t-DBx_{p,t})$ is adjusted to be relatively high, thereby preventing a decrease in the accuracy of $x_{r,t}$.

Comparing the first exemplary embodiment in which the Kalman filter is used with the second exemplary embodiment, the operation time can be reduced in the exemplary embodiment in which the Kalman filter is used because there is no need to repeat the loop processing. Therefore, it is preferable to perform the processing by using the Kalman filter as in the first exemplary embodiment.

Figure 13:
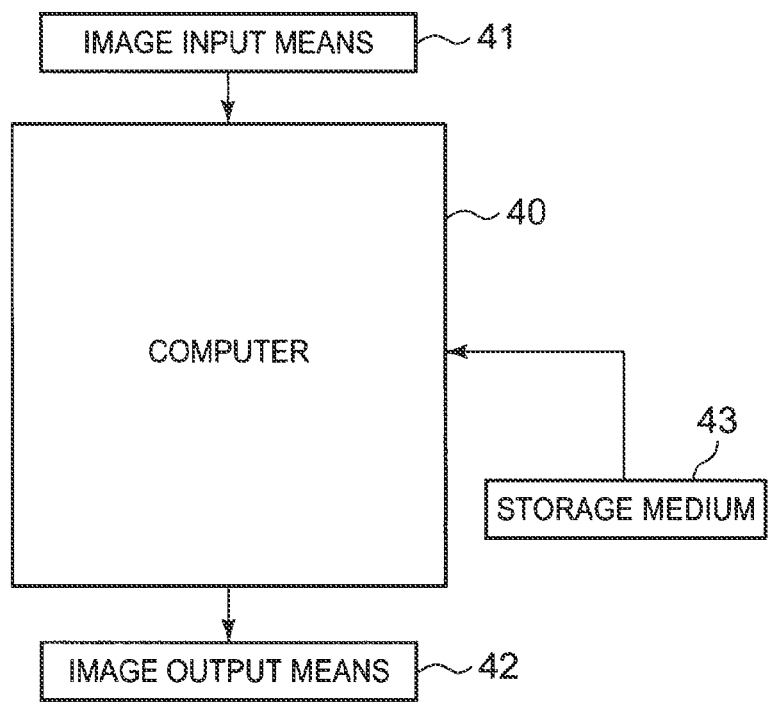
FIG. 13 is a block diagram illustrating a specific configuration example of the image processing system according to the present invention.

FIG. 13 illustrates a specific configuration example of the image processing system according to the present invention. A computer 40 is provided with an image input means 41 which sequentially receives inputs of low-resolution images in individual frames as a video of low-resolution images. Similarly, the computer 40 is provided with an image output means 42 which sequentially outputs super-resolution images in individual frames as a video of super-resolution images. Further, the computer 40 includes a storage medium 43 which stores a program for image processing. Although the storage medium 43 is achieved by a storage device such as, for example, a magnetic disk or a semiconductor memory, the aspect of the storage medium 43 is not particularly limited. The storage medium 43 may be one attachable and detachable to and from the computer. The CPU (not illustrated) of the computer 40 reads the program for image processing from the storage medium 43 and runs, for example, as the image processing system 20 (See FIG. 7) of the first exemplary embodiment or as the image processing system 30 (See FIG. 10) of the second exemplary embodiment, according to the program.

Figure 14:
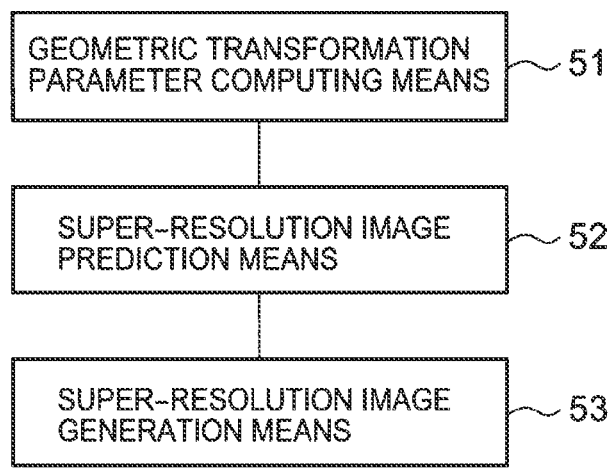
FIG. 14 is a block diagram illustrating a minimum configuration of the present invention.

Subsequently, a minimum configuration of the present invention will be described. FIG. 14 is a block diagram illustrating the minimum configuration of the present invention. The image processing system according to the present invention includes a geometric transformation parameter computing means 51, a super-resolution image prediction means 52, and a super-resolution image generation means 53.

The geometric transformation parameter computing means 51 (for example, the geometric transformation matrix computing means 21) computes a geometric transformation parameter (for example, a geometric transformation matrix $M_{t,t-1}$) representing a geometric transformation of an image from the previous frame to the current frame and calculates the level of reliability in the geometric transformation parameter (for example, geometric transformation reliability).

The super-resolution image prediction means 52 (for example, the super-resolution image prediction means 22) generates the prediction of the super-resolution image in the current frame by transforming the super-resolution image generated in the previous frame on the basis of the geometric transformation parameter.

The super-resolution image generation means 53 (for example, the super-resolution image updating means 23 or 33) generates a super-resolution image in the current frame by calculating a low-resolution image in the current frame from the prediction result of the super-resolution image in the current frame by a simulation, calculating a difference between the low-resolution image, which is an input image for the current frame, and the low-resolution image calculated by the simulation, and calculating a weighted mean between the result of upsampling the difference to the same number of pixels as that of the super-resolution image and the prediction result of the super-resolution image in the current frame. Further, the super-resolution image generation means 53 calculates a weighted mean on the basis of the level of reliability in the geometric transformation parameter when calculating the weighted mean.

According to the above configuration, it is possible to solve a problem of a decrease in the image quality of super-resolution images caused by a failure in registration of images in the case of increasing the resolution of a video.

Moreover, in the above exemplary embodiments, the image processing system having the configuration described in the following (1) to (5) is disclosed.

(1) An image processing system including: a geometric transformation parameter computing means (for example, the geometric transformation matrix computing means 21) for computing a geometric transformation parameter (for example, the geometric transformation matrix $M_{t, t-1}$) which represents a geometric transformation of an image from the previous frame to the current frame and calculating the level of reliability (for example, the geometric transformation reliability) of the geometric transformation parameter; a super-resolution image prediction means (for example, the super-resolution image prediction means 22) for generating a prediction (for example, $x_{p, t}$) of a super-resolution image in the current frame by transforming a super-resolution image generated in the previous frame on the basis of the geometric transformation parameter; and a super-resolution image generation means (for example, the super-resolution image updating means 23, 33) for generating the super-resolution image in the current frame by calculating a low-resolution image in the current frame from the prediction result of the super-resolution image in the current frame by a simulation, calculating a difference between a low-resolution image (for example, $y_t$), which is an input image for the current frame, and the low-resolution image (for example, $DBx_{p, t}$) calculated by the simulation, and calculating a weighted mean between a result of upsampling the difference (for example, $(y_t-DBx_{p, t})$) to the same number of pixels as that of the super-resolution image and the prediction result of the super-resolution image in the current frame, wherein the super-resolution image generation means calculates the weighted mean on the basis of the level of reliability in the geometric transformation parameter.

(2) The image processing system wherein the super-resolution image generation means (for example, the super-resolution image updating means 23 in the first exemplary embodiment) calculates the low-resolution image in the current frame from the prediction result of the super-resolution image in the current frame by the simulation, calculates the difference between the low-resolution image (for example, $y_t$), which is the input image for the current frame, and the low-resolution image (for example, $DBx_{p, t}$) calculated by the simulation, calculates the weighted mean between the result of upsampling the difference (for example, $(y_t-DBx_{p, t})$) to the same number of pixels as that of the super-resolution image and the prediction result of the super-resolution image in the current frame by using a Kalman filter, and uses the calculation result of the weighted mean as the super-resolution image in the current frame.

(3) The image processing system further including an error parameter setting means (for example, the error parameter setting means 24) for setting a first error parameter (for example, the covariance matrix Q), which represents a noise (for example, $w_t$) in the case of representing the super-resolution image in the current frame on the basis of the super-resolution image in the previous frame, and a second error parameter (for example, the covariance matrix R), which represents a noise (for example, $v_t$) in the case of representing the low-resolution image in the current frame on the basis of the super-resolution image in the current frame, on the basis of the level of reliability in the geometric transformation parameter, wherein the super-resolution image generation means calculates a Kalman gain (for example, $K_t$) based on the first error parameter and the second error parameter, multiplies the Kalman gain by the difference (for example, $(y_t-DBx_{p, t})$) between the low-resolution image, which is the input image for the current frame, and the low-resolution image calculated by the simulation, and adds a result value to the prediction result of the super-resolution image in the current frame to calculate the weighted mean between the result of upsampling the difference to the same number of pixels as that of the super-resolution image and the prediction result of the super-resolution image in the current frame.

(4) The image processing system wherein the super-resolution image generation means (for example, the super-resolution image updating means 33 in the second exemplary embodiment) calculates the weighted mean assuming that "r" is a weight coefficient of the prediction result of the super-resolution image in the current frame and "1−r" is a weight coefficient of the result of upsampling the difference between the low-resolution image, which is the input image for the current frame, and the low-resolution image calculated by the simulation, where r is the level of reliability in the geometric transformation parameter.

(5) The image processing system wherein the super-resolution image generation means calculates the low-resolution image in the current frame by performing a simulation calculation representing an imaging process (for example, gradation and downsampling) of a subject for the prediction result of the super-resolution image in the current frame.

While the present invention has been described with reference to exemplary embodiments and examples thereof, the invention is not limited to these exemplary embodiments and examples. The constitution and details of the present invention can be subjected to various modifications that those skilled in the art can understand, in the scope of the present invention.

This application claims the right of priority based on Japanese Patent Application No. 2009-187768, filed on Aug. 13, 2009, which is herein incorporated in its entirety by reference.

INDUSTRIAL APPLICABILITY

The present invention is favorably applicable to uses such as an image processing system for transforming a video of low-resolution images to a video of super-resolution images. For example, in recording a dynamic image taken by a video camera of NTSC (national television system committee) system, the present invention is applicable to an image processing system which stores the dynamic image while transforming the dynamic image to one having an image quality or resolution equivalent to the image quality or resolution of high-definition images in real time. Moreover, in regenerating a video signal, which has been recorded in the NTSC system, by using a player, the present invention is also applicable to an image processing system which outputs the video signal to a display device while transforming the video signal to one having an image quality or resolution equivalent to the image quality or resolution of high-definition images in real time. Further, in receiving and displaying a video picture of NTSC system by using a high-definition television receiver, the present invention is also applicable to a television receiver which displays the video picture while transforming the video picture to one having an image quality or resolution equivalent to the image quality or resolution of high-definition images in real time.

REFERENCE SIGNS LIST

21 Geometric transformation matrix computing means
22 Super-resolution image prediction means
23, 33 Super-resolution image updating means
24 Error parameter setting means

The invention claimed is:

1. An image processing system comprising:
   a geometric transformation parameter computing unit for computing a geometric transformation parameter which represents a geometric transformation of an image from a previous frame to a current frame and calculating a level of reliability in the geometric transformation parameter;
   a super-resolution image prediction unit for generating a prediction of a super-resolution image in the current frame by transforming a super-resolution image generated in the previous frame on the basis of the geometric transformation parameter; and
   a super-resolution image generation unit for generating the super-resolution image in the current frame by calculating a low-resolution image in the current frame from the prediction result of the super-resolution image in the current frame by a simulation, calculating a difference between a low-resolution image, which is an input image for the current frame, and the low-resolution image calculated by the simulation, and calculating a weighted mean between a result of upsampling the difference to the same number of pixels as that of the super-resolution image and the prediction result of the super-resolution image in the current frame, wherein the super-resolution image generation unit calculates the weighted mean on the basis of the level of reliability in the geometric transformation parameter.

2. The image processing system according to claim 1, wherein the super-resolution image generation unit calculates the low-resolution image in the current frame from the prediction result of the super-resolution image in the current frame by the simulation, calculates the difference between the low-resolution image, which is the input image for the current frame, and the low-resolution image calculated by the simulation, calculates the weighted mean between the result of upsampling the difference to the same number of pixels as that of the super-resolution image and the prediction result of the super-resolution image in the current frame by using a Kalman filter, and uses the calculation result of the weighted mean as the super-resolution image in the current frame.

3. The image processing system according to claim 2, further comprising an error parameter setting unit for setting a first error parameter, which represents a noise in the case of representing the super-resolution image in the current frame on the basis of the super-resolution image in the previous frame, and a second error parameter, which represents a noise in the case of representing the low-resolution image in the current frame on the basis of the super-resolution image in the current frame, on the basis of the level of reliability in the geometric transformation parameter,
   wherein the super-resolution image generation unit calculates a Kalman gain based on the first error parameter and the second error parameter, multiplies the Kalman gain by the difference between the low-resolution image, which is the input image for the current frame, and the low-resolution image calculated by the simulation, and adds a result value to the prediction result of the super-resolution image in the current frame to calculate the weighted mean between the result of upsampling the difference to the same number of pixels as that of the super-resolution image and the prediction result of the super-resolution image in the current frame.

4. The image processing system according to claim 1, wherein the super-resolution image generation unit calculates the weighted mean assuming that "r" is a weight coefficient of the prediction result of the super-resolution image in the current frame and "1−r" is a weight coefficient of the result of up sampling the difference between the low-resolution image, which is the input image for the current frame, and the low-resolution image calculated by the simulation, where r is the level of reliability in the geometric transformation parameter.

5. The image processing system according to claim 1, wherein the super-resolution image generation unit computes the low-resolution image in the current frame by performing a simulation calculation representing an imaging process of a subject for the prediction result of the super-resolution image in the current frame.

6. An image processing method which comprises:
   computing a geometric transformation parameter which represents a geometric transformation of an image from a previous frame to a current frame and calculating a level of reliability in the geometric transformation parameter;
   generating a prediction of a super-resolution image in the current frame by transforming a super-resolution image generated in the previous frame on the basis of the geometric transformation parameter;
   generating the super-resolution image in the current frame by calculating a low-resolution image in the current frame from the prediction result of the super-resolution image in the current frame by a simulation, calculating a difference between a low-resolution image, which is an input image for the current frame, and the low-resolution image calculated by the simulation, and calculating a weighted mean between a result of upsampling the difference to the same number of pixels as that of the super-resolution image and the prediction result of the super-resolution image in the current frame; and
   calculating the weighted mean on the basis of the level of reliability in the geometric transformation parameter in calculating the weighted mean.

7. The image processing method according to claim 6, wherein the low-resolution image in the current frame is calculated from the prediction result of the super-resolution image in the current frame by the simulation, the difference between the low-resolution image, which is the input image for the current frame, and the low-resolution image calculated by the simulation, is calculated, the weighted mean between the result of upsampling the difference to the same number of pixels as that of the super-resolution image and the prediction result of the super-resolution image in the current frame is calculated by using a Kalman filter, and the calculation result of the weighted mean is used as the super-resolution image in the current frame.

8. The image processing method according to claim 7, which further comprises:
   setting a first error parameter, which represents a noise in the case of representing the super-resolution image in the current frame on the basis of the super-resolution image in the previous frame, and a second error parameter, which represents a noise in the case of representing the low-resolution image in the current frame on the basis of the super-resolution image in the current frame, on the basis of the level of reliability in the geometric transformation parameter;
   calculating a Kalman gain based on the first error parameter and the second error parameter; and
   multiplying the Kalman gain by the difference between the low-resolution image, which is the input image for the current frame, and the low-resolution image calculated by the simulation, and adding a result value to the prediction result of the super-resolution image in the current frame to calculate the weighted mean between the result of upsampling the difference to the same number of pixels as that of the super-resolution image and the prediction result of the super-resolution image in the current frame.

9. The image processing method according to claim 6, wherein the weighted mean is calculated assuming that "r" is a weight coefficient of the prediction result of the super-resolution image in the current frame and "1−r" is a weight coefficient of the result of upsampling the difference between the low-resolution image, which is the input image for the current frame, and the low-resolution image calculated by the simulation, where r is the level of reliability in the geometric transformation parameter.

10. The image processing method according to claim 6, wherein the low-resolution image in the current frame is computed by performing a simulation calculation representing an imaging process of a subject for the prediction result of the super-resolution image in the current frame.

11. A non-transitory computer readable information recording medium storing a program which, when executed by a processor, performs a method comprising:
computing a geometric transformation parameter which represents a geometric transformation of an image from a previous frame to a current frame and calculating a level of reliability in the geometric transformation parameter;
generating a prediction of a super-resolution image in the current frame by transforming a super-resolution image generated in the previous frame on the basis of the geometric transformation parameter; and
generating the super-resolution image in the current frame by calculating a low-resolution image in the current frame from the prediction result of the super-resolution image in the current frame by a simulation, calculating a difference between a low-resolution image, which is an input image for the current frame, and the low-resolution image calculated by the simulation, and calculating a weighted mean between a result of upsampling the difference to the same number of pixels as that of the super-resolution image and the prediction result of the super-resolution image in the current frame,
wherein, when generating the super-resolution image, calculating the weighted mean on the basis of the level of reliability in the geometric transformation parameter.

12. The non-transitory computer readable information recording medium according to claim 11, wherein, when generating the super-resolution image, calculating the low-resolution image in the current frame from the prediction result of the super-resolution image in the current frame by the simulation, calculating the difference between the low-resolution image, which is the input image for the current frame, and the low-resolution image calculated by the simulation, calculating the weighted mean between the result of upsampling the difference to the same number of pixels as that of the super-resolution image and the prediction result of the super-resolution image in the current frame by using a Kalman filter, and using the calculation result of the weighted mean as the super-resolution image in the current frame.

13. The non-transitory computer readable information recording medium according to claim 12, further comprising, setting a first error parameter, which represents a noise in the case of representing the super-resolution image in the current frame on the basis of the super-resolution image in the previous frame, and a second error parameter, which represents a noise in the case of representing the low-resolution image in the current frame on the basis of the super-resolution image in the current frame, on the basis of the level of reliability in the geometric transformation parameter,
wherein, when generating the super-resolution image, calculating a Kalman gain based on the first error parameter and the second error parameter; and
multiplying the Kalman gain by the difference between the low-resolution image, which is the input image for the current frame, and the low-resolution image calculated by the simulation, and adding a result value to the prediction result of the super-resolution image in the current frame to calculate the weighted mean between the result of upsampling the difference to the same number of pixels as that of the super-resolution image and the prediction result of the super-resolution image in the current frame.

14. The non-transitory computer readable information recording medium according to claim 11, wherein, when generating the super-resolution image, calculating the weighted mean assuming that "r" is a weight coefficient of the prediction result of the super-resolution image in the current frame and "1−r" is a weight coefficient of the result of upsampling the difference between the low-resolution image, which is the input image for the current frame, and the low-resolution image calculated by the simulation, where r is the level of reliability in the geometric transformation parameter.

15. The non-transitory computer readable information recording medium according to claim 11, wherein, when generating the super-resolution image, computing the low-resolution image in the current frame by performing a simulation calculation representing an imaging process of a subject for the prediction result of the super-resolution image in the current frame.

16. An image processing system comprising:
a hardware including a processor and a memory,
the hardware configured to:
compute a geometric transformation parameter which represents a geometric transformation of an image from a previous frame to a current frame;
generate a prediction of a super-resolution image in the current frame by transforming a super-resolution image generated in the previous frame on the basis of the geometric transformation parameter; and
generate the super-resolution image in the current frame by:
calculating a low-resolution image in the current frame from the prediction result of the super-resolution image in the current frame by a simulation,
calculating a difference between a low-resolution image, which is an input image for the current frame, and the low-resolution image calculated by the simulation, and
calculating a weighted mean based on the difference.

* * * * *